United States Patent
Stackhouse (10) Patent No.: US 6,745,551 B2
(45) Date of Patent: Jun. 8, 2004

(54) OVERHEAD SHAKER HARVESTER

(76) Inventor: Don Stackhouse, 13501 Cogswell Rd., Hickman, CA (US) 95323

( * ) Notice: Subject to any disclaimer, the term of this patent is extended or adjusted under 35 U.S.C. 154(b) by 0 days.

(21) Appl. No.: 10/211,441

(22) Filed: Aug. 2, 2002

(65) Prior Publication Data

US 2004/0020181 A1 Feb. 5, 2004

(51) Int. Cl.⁷ .............................................. A01D 46/00
(52) U.S. Cl. ...................................................... 56/340.1
(58) Field of Search ................ 56/328.1, 329, 56/340.1

(56) References Cited

U.S. PATENT DOCUMENTS

| | | | |
|---|---|---|---|
| 3,413,788 A | * 12/1968 | Merk | 56/329 |
| 3,473,310 A | 10/1969 | Christianson | |
| 3,541,773 A | * 11/1970 | Adrian | 56/329 |
| 3,596,455 A | * 8/1971 | Adrian | 56/329 |
| 3,606,749 A | * 9/1971 | Morrison et al. | 56/329 |
| 3,635,004 A | 1/1972 | Webb et al. | |
| 3,683,617 A | * 8/1972 | Vallicella | 56/329 |
| 3,775,954 A | 12/1973 | Van Schoyck | |
| 3,964,244 A | * 6/1976 | Vallicella | 56/329 |
| 4,157,642 A | * 6/1979 | Butler | 56/329 |
| 4,286,426 A | 9/1981 | Orlando et al. | |
| 4,683,969 A | * 8/1987 | Littau | 180/6.48 |
| 5,123,238 A | 6/1992 | Renehan | |
| 5,191,758 A | 3/1993 | Cote | |
| 5,469,695 A | 11/1995 | Zehavi et al. | |
| 5,816,037 A | 10/1998 | Chiel et al. | |
| 5,921,074 A | 7/1999 | Scott et al. | |
| 6,421,995 B1 | * 7/2002 | Sancho | 56/340.1 |

FOREIGN PATENT DOCUMENTS

| | | | |
|---|---|---|---|
| FR | 2238419 | * | 3/1975 |
| FR | 2345063 | * | 11/1977 |

* cited by examiner

Primary Examiner—Thomas B. Will
Assistant Examiner—Nathan Mammen
(74) Attorney, Agent, or Firm—Mark D. Miller (57) ABSTRACT

A single-unit shaker-type tree harvesting machine designed to travel down one side of a row of trees in order to harvest the entire crop from each tree. A wheel-based chassis supports a laterally disposed shaker and an angled catch frame together and conveyors for removing harvested crops. The chassis also supports an adjustable overhead structure and swingable carriage that extends down around the opposite side of each tree. An adjustable catch frame at the bottom of the carriage extends below the tree branches on the opposite side, and meets the chassis-mounted catch frame forming a complete crop catching frame in the shape of a wide modified V. Shaking the tree dislodges the crops which fall into the frame and are conveyed away from the harvester.

18 Claims, 6 Drawing Sheets

OVERHEAD SHAKER HARVESTER

BACKGROUND OF THE INVENTION

1. Field of the Invention

The present invention relates to agricultural harvesting machines, and more particularly to a shaker harvester for citrus, nut or other trees having a uniquely designed moveable overhead carriage assembly that allows the harvesting of crops to take place from one side of a tree.

2. Description of the Prior Art

It is well known that many agricultural orchard crops, particularly those having durable exterior surfaces such as nuts and citrus, can be efficiently harvested by shaking the trees in which the crop is borne. As a result, numerous shaker harvesters have been developed over the years to shake such crops from trees. A typical shaker harvester includes a vibration inducing mechanism that can be temporarily anchored or attached to the trunk of the tree. Operating the mechanism shakes the tree thereby dislodging the crops borne in the upper branches. At harvest time, a typical shaker harvester is moved throughout the orchard from tree to tree to shake loose the crop.

For lighter crops such as nuts (almonds, walnuts, pecans, etc.) the crop may be shaken onto the bare ground surrounding the trees that has been specially prepared by leveling, drying and elimination of weeds. Then, a vacuum harvesting machine follows which vacuums up the crop from the ground. Thus, two different machines are required to remove the crop from the orchard. A separating device is then used to separate and remove any rocks, twigs or other debris picked up by the vacuum along with the crop.

For heavier crops such as citrus, workers may be employed to pick up the dislodged fruit. However, this method is labor intensive and time consuming, and potentially more expensive than using a vacuum. In some instances, fabric sheeting is placed on the ground surrounding the tree so that the crop that is shaken loose lands on the sheeting. The crop-laden sheets are then removed and the crop deposited in collection bins. However, this is still labor intensive, time consuming, and expensive. In addition, a separating device may still be required to remove any twigs or other debris that falls onto the sheets along with the crop.

A conventional method for harvesting citrus crops is to provide a shaker apparatus on one side of the tree and a receiver apparatus on the other side. Both the shaker and the receiver machines have fruit collection panels which are inserted under the tree and which engage each other. The shaker then shakes the tree, dislodging the crops that fall onto the collection panels and are removed using conveyers on the receiver machine. Of course, this method requires two machines: a shaker and a receiver, with each machine traveling down one side of the row of trees as described in U.S. Pat. Nos. 5,469,695 and 5,816,037 as well as 3,775, 954. Lining up and engaging the fruit collection panels of each of the dual machines under each tree is difficult and time consuming, and if not done properly can result in the dislodged crop landing on the ground. This problem has been addressed to some extent by connecting the shaker and receiver machines to a common straddling frame as that described in U.S. Pat. No. 3,473,310, or by using a common frame as described in U.S. Pat. No. 3,635,004. However, with or without a frame, operation of the dual machines must still be carefully coordinated or dislodged fruit will be lost. Some harvesters combine the two machines into a single large apparatus that straddles the row with massive supports that travel down both sides of the row, as described in U.S. Pat. Nos. 4,286,426 and 5,921,074. However, these machines still require support on both sides of the row.

Importantly, if one side of the row is impassable, such as when it is a ditch, cliff, embankment or fence, then none of the dual support harvesting machines can be used.

The harvesters of U.S. Pat. Nos. 5,123,238 and 5,191,758 address this problem to some extent, providing a harvester that may be brought in from one side of a row that has a fruit-catching platform in the form of a collapsible bowl. The bowl is opened to surround the tree from the bottom during harvesting, and then closed as the unit travels from tree to tree. However, both of these harvesters are large and both require considerable zigzag-type maneuvering for proper positioning from tree to tree, making them clumsy to use and unsuitable for use in orchards where the rows of trees are close together.

It is therefore desirable to provide a shaker-type tree harvesting machine in a single unit that is capable of traveling in a narrow space between rows of trees and which is capable of harvesting all of the fruit of a given tree from one side of the tree.

SUMMARY OF THE INVENTION

The present invention is a single-unit shaker-type tree-harvesting machine designed to travel down one side of a row of trees in order to harvest all of the crop therefrom. The main section of the machine is mounted on a wheel-based chassis that supports a laterally disposed shaker and an angled catch frame together with conveyors for removing harvested crops (e.g. citrus, nuts, etc.). The shaker and catch frame are driven into very close proximity with a tree so that the shaker can be attached to the trunk, with the catch frame below the branches on one side of the tree (the near side). Also mounted on the chassis is an adjustable overhead support to which a hingedly mounted carriage structure is attached. The carriage structure extends down from the overhead support and includes a hingedly attached oppositely angled lower catch frame. The adjustable overhead support is designed to be raised higher than the top of a tree, with the hinged carriage extending over the top of the tree and down the opposite side. The catch frame at the bottom of the carriage extends below the tree branches on the opposite (far) side of the tree, and attaches near the chassis-mounted catch frame, leaving a central gap below which a deflection panel is provided. The catch frames form a structure having a cross-section in the shape of a wide modified V below the tree branches. Shaking the tree dislodges the crops that fall into the V-shaped catch frame structure where they are funneled onto the central deflection panel and then conveyed away from the harvester.

The overhead structure is vertically adjustable using telescoping or otherwise extendable members. The upper portion of the overhead structure is also horizontally adjustable using similar telescoping or extendable members, allowing it to be adjusted for trees of different heights and widths. The carriage is hingedly attached to the upper portion of the overhead structure. The hinges on the carriage and associated catch frame allow the carriage and catch frame to swing in and out as the harvester travels from tree to tree. When the carriage swings in, the panels of the near and far side catch frames meet or inter-engage so that there is no gap to avoid loss of dislodged crops. This engagement forms the V-shaped structure of the complete catch frame. The crops collect in the catch frame panels and are removed by conveyors on the shaker side. When the shaking is complete, the frames disengage, the carriage swings out, the shaker is retracted and the unit moves to the next tree. At the next tree, the shaker is again attached to the trunk, the carriage swings in, the catch frames are engaged, and the harvesting process repeats. Thus, each tree in a row may be completely harvested from one side of the row.

It is therefore a primary object of the present invention to provide a machine that is capable of harvesting citrus, nut or other trees from only one side of a row, allowing trees along ditches or embankments to be mechanically harvested.

It is also a primary object of the present invention to provide a shaker harvester for citrus or nut trees that is capable of traveling down narrow spaces between rows of trees in an orchard while harvesting such trees from only one side of a row.

It is an important object of the present invention to provide a shaker harvester designed to travel down one side of a row of trees in an orchard, the harvester having a laterally disposed shaking device, a first laterally disposed crop catching panel, and an overhead structure supporting a swingable carriage and a second crop catching panel, the second panel being designed to engage near the first panel when the carriage swings in so as to form a receptacle to catch all of the crops shaken from a tree.

It is another important object of the present invention to provide a tree shaking harvester on a wheel-based chassis that supports a near side catch frame and an adjustable overhead support for a swingable carriage attached to a far side catch frame, such that when the carriage swings in, the near and far side catch frames meet above a lower deflection panel thereby surrounding the base of the tree in order to catch and collect the crops shaken loose from the tree.

Additional objects of the invention will be apparent from the detailed descriptions and the claims herein.

DETAILED DESCRIPTION OF A PREFERRED EMBODIMENT

Figure 1:
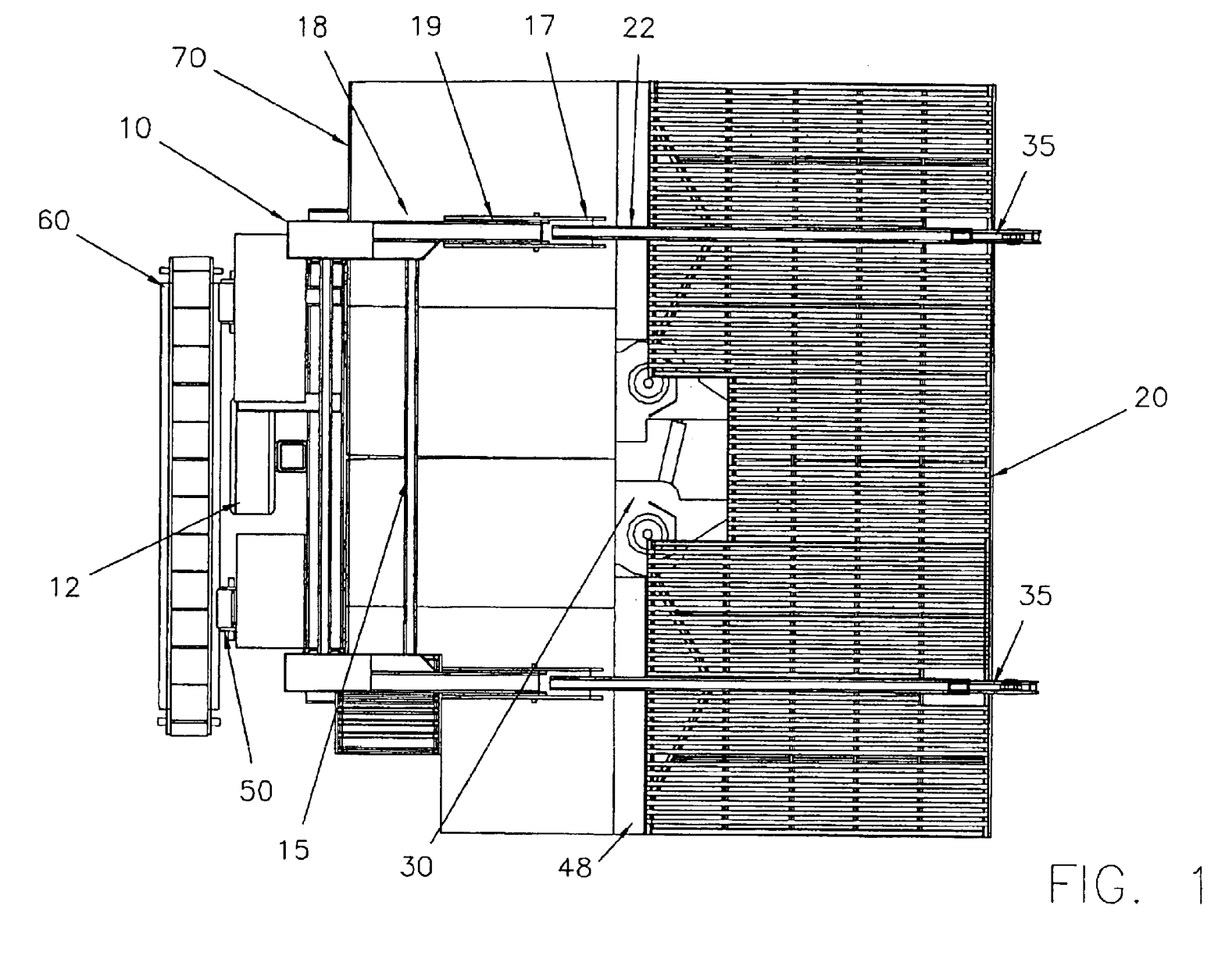
FIG. 1 is a top plan view of the harvester of the present invention.
Figure 2:
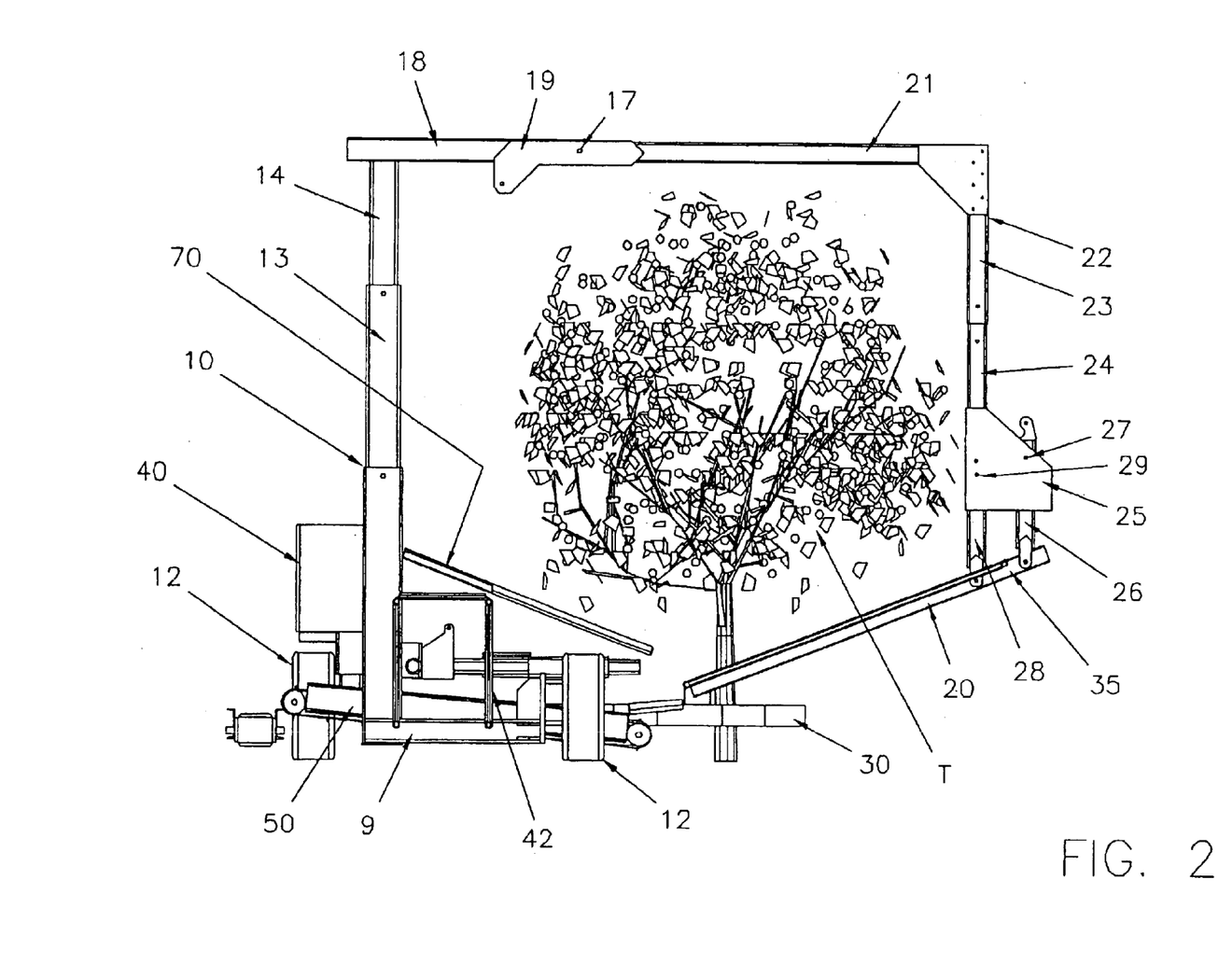
FIG. 2 is an end view of the present invention engaged around a tree.
Figure 3:
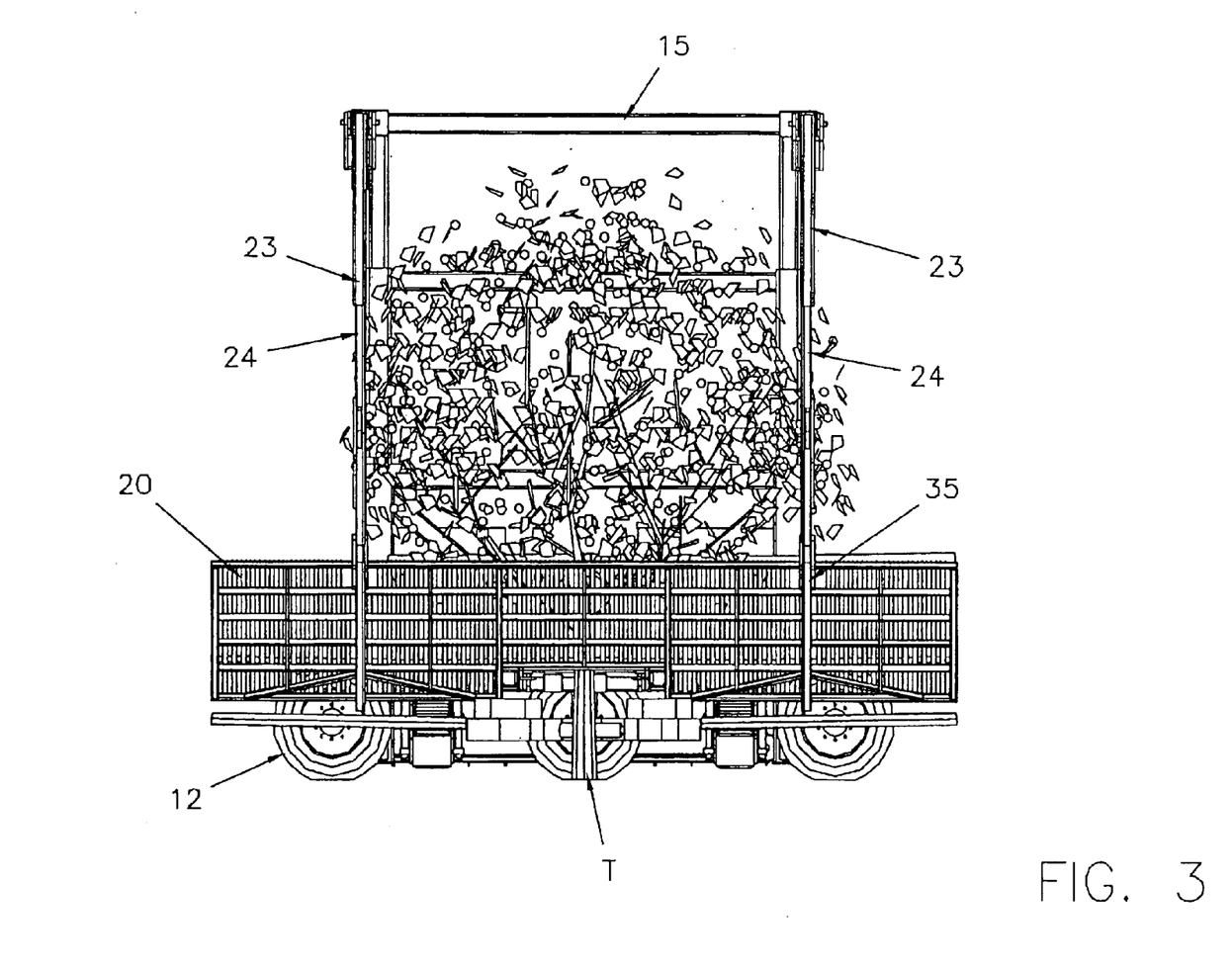
FIG. 3 is a side view of the present invention engaged around a tree.
Figure 4:
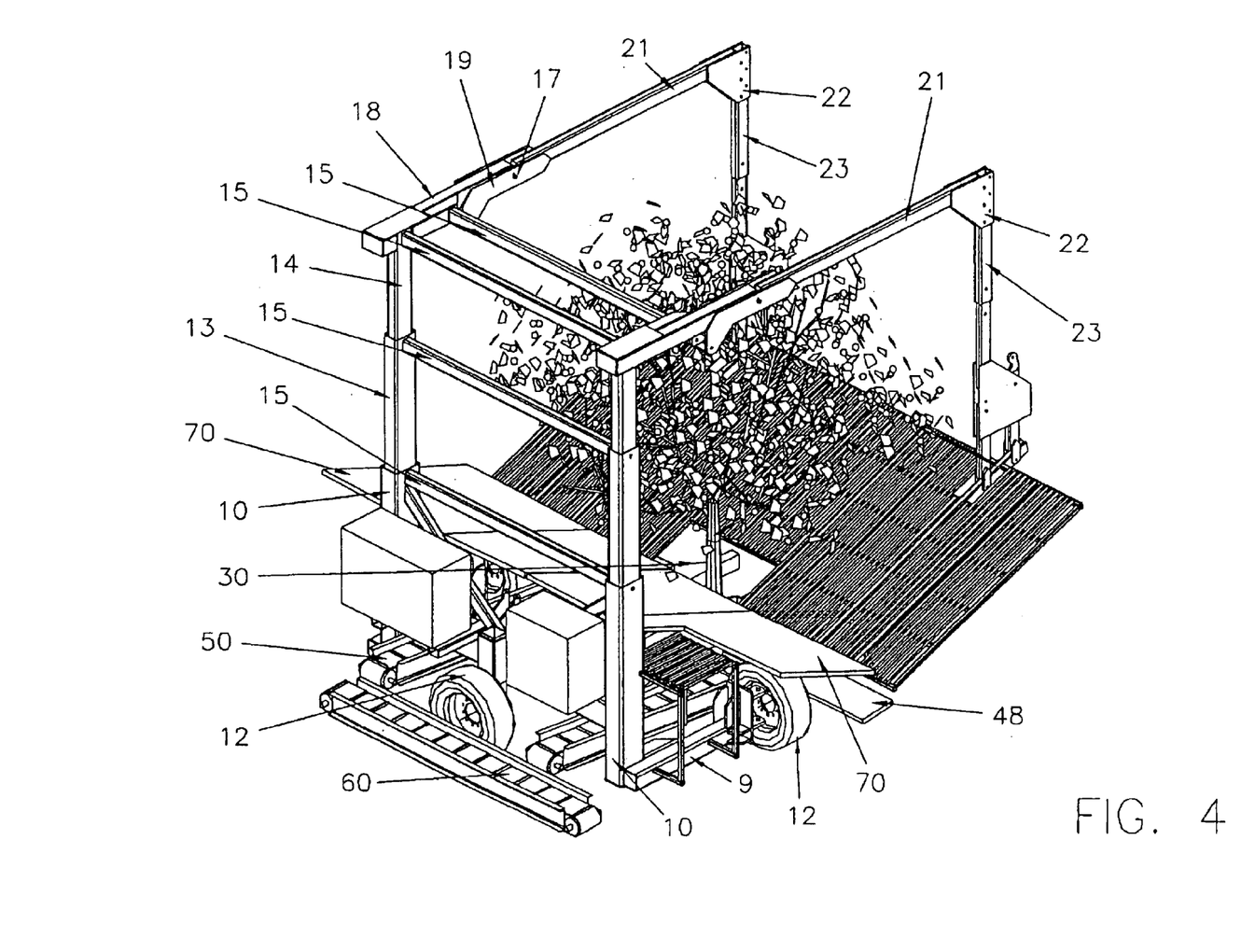
FIG. 4 is a top perspective view of the present invention engaged around a tree.
Figure 5:
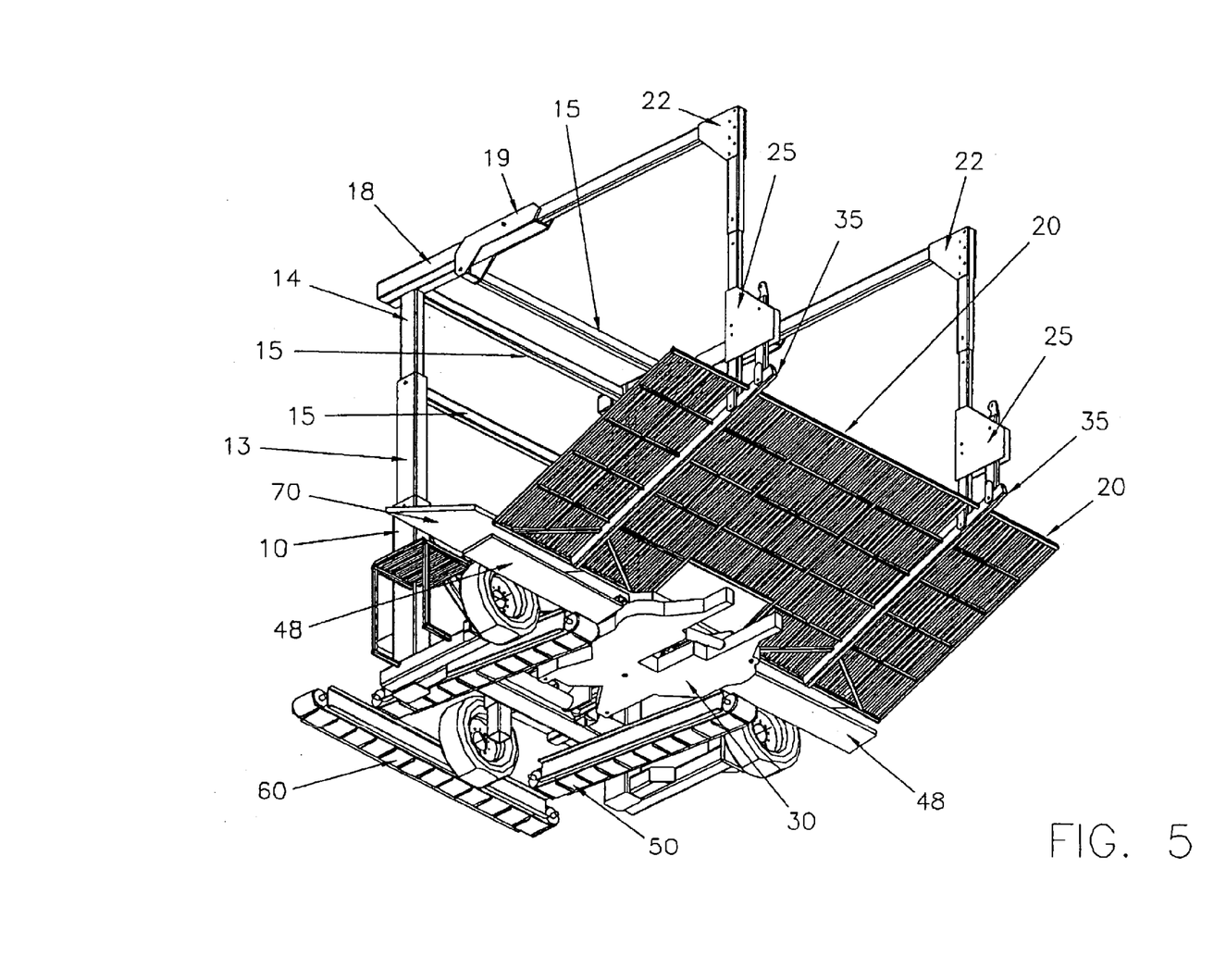
FIG. 5 is a bottom perspective view of the present invention.

Referring to the drawings wherein like reference characters designate like or corresponding parts throughout the several views, and referring particularly to FIGS. 2 and 4, it is seen that the harvester of the present invention includes a main chassis 9 with engine 40 and operator station 42 supported by a set of wheels 12. The illustrations show the use of three wheels 12, but any suitable number of wheels may be employed so long as the harvester is balanced, and capable of traveling along a surface such as the space between rows in an orchard. The chassis 9 supports a laterally disposed tree-shaking device 30 that is designed for temporary attachment to the trunk of a tree T. Shaker 30 may be of any suitable design, so long as it may be readily attached to and detached from the trunk of a tree, and imparts sufficient vibration to the tree to dislodge the crop borne in the branches thereof without undue damage to the tree or trunk. The lateral position of the shaker 30 allows it to be attached to tree after tree as the harvester is driven along a row of trees in parallel with the row.

Harvester chassis 9 supports a set of collection panels 70 that are tilted in a downward direction from the center of the chassis at an angle so as to deflect crops that are dislodged from tree T by the shaker 30 of the harvester. Any suitable number of panels 70 may be employed so long as the panels abut and/or interconnect such that harvested crops do not drop between the panels, and so long as the panels 70 substantially cover the area over the chassis that is moved under each tree, thereby maximizing the amount of dislodged crop that is collected. Of course, a single large panel 70 may also be employed. Panels 70 deflect and direct the dislodged crops downward onto collection panels 48 that are located below panels 70. The angle of panels 70 and the force of gravity bring the dislodged crop onto lower panels 48 which, in turn, direct the crop onto feed conveyors 50. Panels 48 may include peripheral ridges or lips to prevent the harvested crop from falling off. Conveyors 50, in turn, move the crop away from the tree T in a direction that is generally perpendicular to the row and deposit the crop onto a lateral conveyor 60. Lateral conveyor 60 then moves the crop in a direction that is generally parallel to the row and deposit it into a waiting receptacle such as a box or wagon.

An overhead support structure is also mounted on chassis 9. This structure includes a pair of vertical support posts 10 separated and reinforced by a cross member 15. Each post 10 has one or more adjustable telescoping inner posts 13 that are also separated and reinforced by a cross member 15. At the tops of the uppermost of inner posts 13 are adjustable telescoping upper support posts 14 that are also separated and reinforced by a cross member 15. It is to be appreciated that any suitable vertically adjustable support structure may be employed so long as it may be extended to a height that is above the top of the tree T to be harvested, and so long as it is strong enough to support and tolerate the stresses imparted by the swinging carriage and catch frame described below.

A pair of generally horizontal cantilevered support arms 18 are attached to the tops of support posts 14. A pair of plates 19 having a hinge 17 are provided at the end of each support arm 18. An L-shaped carriage structure is provided made up of a first pair of generally horizontal arms 21 and a second pair of generally vertical arms 23, one end of each of which is attached to a pair of corner brackets 22. The opposite ends of arms 21 are attached to hinge 17. Thus, L-shaped carriage structure 21-22-23 is capable of swinging up and down around the pivot of hinge 17. This swinging motion may be imparted by any suitable mechanical means, or by the use of cables or wires. The opposite ends of arms 23 are adjustably attached to first ends of telescoping arms 24. The opposite ends of arms 24 are attached to a pair of hinge plates 25. Each pair of hinge plates 25 supports first and second moveable, generally vertical frame stabilizing arms 26 and 28. Both ends of arms 26 and 28 are pivotally attached so as to allow parallel movement. The proximal ends of arms 26 and 28 are pivotally mounted to hinge plate 25. The distal ends of arms 26 and 28 are pivotally mounted to support arms 35, and catch frame 20 is attached to arms 35. Movement of catch frame 20 according to the pivotal mounting of arms 26 and 28 is accomplished using any suitable mechanical means, or by the use of cables or wires.

Figure 6:
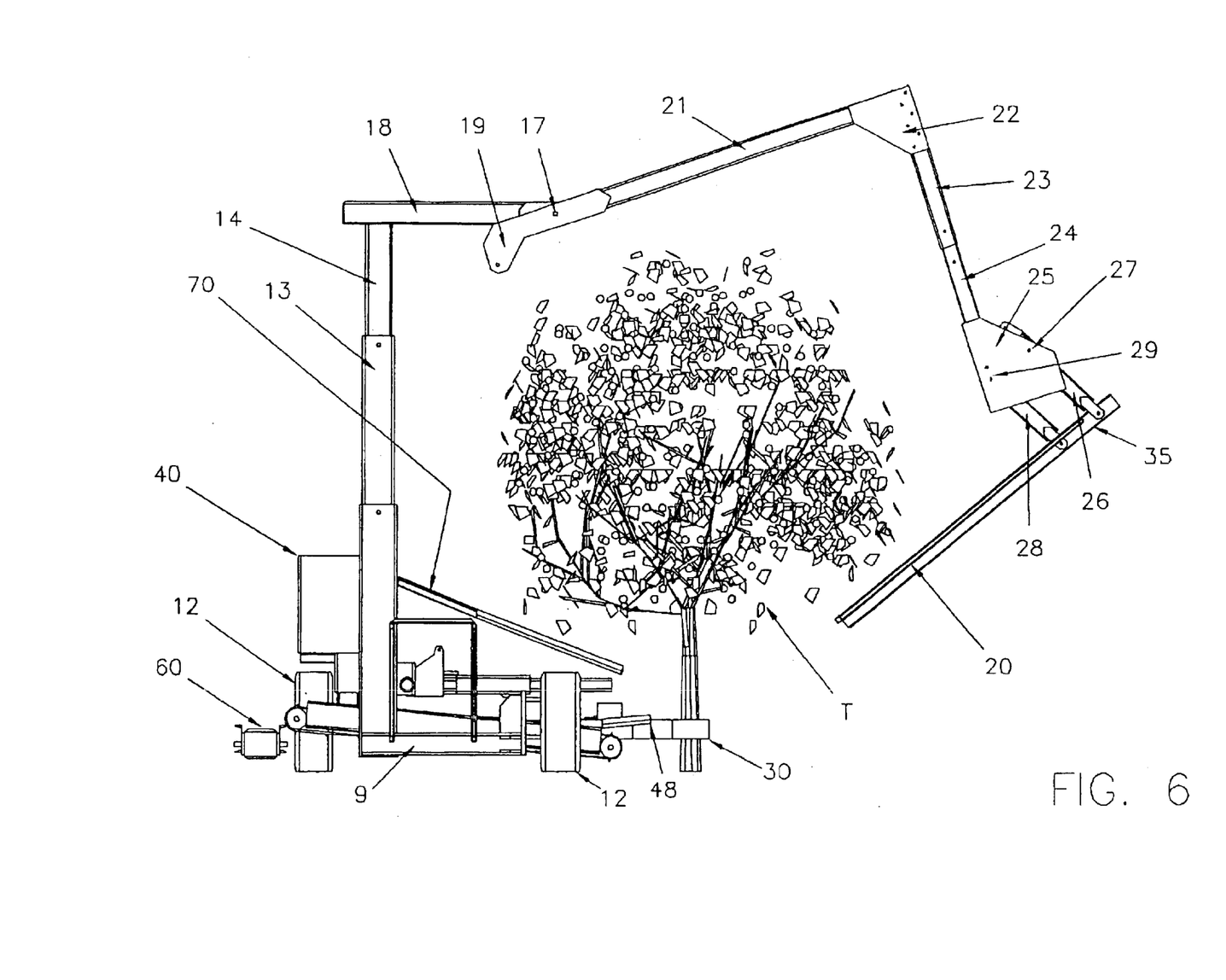
FIG. 6 is an end view of the present invention showing the carriage in an open position.

FIG. 6 shows the carriage 21-22-23 in a partially retracted position having been partially rotated upward around pivot 17. This view also shows arms 26 and 28 having been partially rotated on pivots 27 and 29 resulting in a retraction of catch frame 20 away from tree T. The moveability of arms 26 and 28 allows catch frame 20 to be extended or retracted independently from the rotation of carriage 21-22-23. This allows for more fine tuned adjustment of the position and angle of frame 20, and engagement with lock 49 while harvesting takes place.

In use, the vertical height of support arms 18 are established by adjusting posts 13 and 14. This height is higher than the tallest tree to be harvested in the orchard. Carriage 21-22-23 and catch frame 20 are retracted, as shown in FIG. 6. The harvester is then driven into the orchard along a row of trees in parallel with the row, such that catch panels 70 are below the drip line of the trees along the near side. When a first tree T is reached, the lateral shaker 30 is engaged with the trunk of the tree. Carriage 21-22-23 is lowered, and catch frame 20 is maneuvered under the tree on the far side. Panel 20 is then temporarily engaged to chassis 9 using lock 49. At this point, the shaker mechanism 30 is engaged, shaking the tree and dislodging the crop therefrom. The crop drops onto catch panels 70 and catch frame 20, and is deflected with the help of gravity onto panels 48. Panels 48 direct the harvested crop to conveyors 50 which move the crop laterally through the harvester. Conveyors 50 deposit the crop onto conveyor 60 that removes the crop from the harvester and drops it into a waiting receptacle. When the shaking and removal of the crop from the tree is completed, lock 49 is disengaged, carriage 21-22-23 and frame 20 are retracted, shaker 30 is disengaged, and the harvester travels down the row to the next tree to repeat the process.

It is to be understood that variations and modifications of the present invention may be made without departing from the scope thereof It is also to be understood that the present invention is not to be limited by the specific embodiments disclosed herein, but only in accordance with the appended claims when read in light of the foregoing specification.

What is claimed is:

1. A tree harvesting machine comprising a mobile wheel-based chassis, a laterally disposed tree shaking device mounted on said chassis, a first set of angled crop catching panels mounted on said chassis adjacent to said shaking device, a deflection panel mounted below said angled catch panels, and a vertically adjustable upwardly extending support structure mounted on said chassis, said support structure having a horizontally adjustable overhead section to which a swingable carriage is hingedly attached, said carriage extending out and away from said overhead section and including a lower section to which a second set of angled crop catching panels are attached, such that said second set of panels detachably engage said chassis near said first set of panels and above said deflection panel when the carriage swings in so as to form a receptacle below the branches of a tree for catching the crops shaken from the tree.

2. The machine of claim 1 wherein said vertically adjustable support structure comprises a pair of telescoping support members, and said overhead section comprises a pair of cantilevered support members.

3. The machine of claim 2 wherein said carriage comprises a pair of L-shaped support members, each such member being pivotally attached at one end to one of said cantilevered support members, and pivotally attached at the opposite end to one of said second set of crop catching panels.

4. The machine of claim 3 wherein a first means is provided for imparting movement to said carriage, and a second means is provided for imparting movement to said second set of crop catching panels.

5. The machine of claim 1 wherein a first conveyor is provided for removing the harvested crop from said deflection panel, and a second conveyor is provided for transporting said crop from said first conveyor away from said machine.

6. A machine for harvesting the crop of a tree comprising a wheel-based chassis for movable deployment on one side of the tree, said chassis supporting a tree shaking mechanism detachably attachable to the trunk of the tree, a near side angled catch frame, a deflection panel below said catch frame, and a vertically adjustable support, said support having a swingable carriage hingedly attached thereto for extending over and around the far side of said tree, said carriage including a lower angled far side catch frame, such that said carriage swings out to allow said machine to travel from tree to tree, and said carriage swings in to allow said far side catch frame to engage said chassis to surround the base of a tree in order to catch and collect the crops shaken loose from the tree.

7. The machine of claim 6 wherein a first conveyor is provided for removing the harvested crop from said deflection panel, and a second conveyor is provided for transporting said crop from said first conveyor away from said machine.

8. The machine of claim 7 wherein said vertically adjustable support comprises as pair of telescoping support members, and an overhead section having a pair of cantilevered support members.

9. The machine of claim 8 wherein said carriage comprises a pair of L-shaped support members, each such member being pivotally attached at one end to one of said cantilevered support members, and pivotally attached at the opposite end to said far side catch frame.

10. The machine of claim 9 wherein a first means is provided for imparting movement to said carriage, and a second means is provided for imparting movement to said far side catch frame.

11. A machine for harvesting the crop of a tree comprising a wheel-based chassis supporting a tree shaking mechanism detachably attachable to the trunk of the tree, an angled near side catch frame for positioning below the near side of the tree, and a vertically adjustable support, said support having a swingable carriage hingedly attached thereto for extending over and around the far side of the tree, said carriage including a lower angled far side catch frame, wherein said carriage and far side catch frame are both suspended in spaced relation to the earth on the far side of the tree such that the carriage swings open to allow the machine to travel from tree to tree, and the carriage swings closed to allow the far side catch frame to be positioned below the far side of the tree to surround the base of the tree in order to catch and collect the crops shaken loose from the tree.

12. The machine of claim 11 wherein said chassis is movably deployed on only one side of the tree.

13. The machine of claim 12 wherein a deflection panel is provided on the chassis below the near side catch frame, a first conveyor is provided on the chassis for removing the harvested crop from the deflection panel, and a second conveyor is provided on the chassis for transporting said crop from the first conveyor away from the machine.

14. A tree harvesting machine comprising a mobile wheel-based chassis for movable deployment down one side of a row of trees, a laterally disposed tree shaking device mounted on said chassis, a first set of angled crop catching panels mounted on said chassis adjacent to said shaking device, a deflection panel mounted below said angled catch panels, and a vertically adjustable upwardly extending support structure mounted on said chassis, said support structure having a horizontally adjustable overhead section to which a swingable carriage is hingedly attached for movement between open and closed positions on the opposite sides of the trees of said row, said carriage extending out and away from said overhead section and including a lower section to which a second set of angled crop catching panels are attached, such that said second set of panels detachably engage said chassis near said first set of panels and above said deflection panel when the carriage swings closed so as to form a receptacle below the branches of a tree for catching the crops shaken from the tree.

15. The machine of claim 14 wherein a first conveyor is provided on the chassis for removing the harvested crop from the deflection panel, and a second conveyor is provided on the chassis for transporting the crop from the first conveyor away from the machine.

16. A method for harvesting tree crops from one side of a tree comprising the steps of:
   a. moving a wheel-based chassis to one side of a tree, said chassis supporting a tree shaking mechanism, a near side angled catch frame, a deflection panel below said catch frame, and a vertically adjustable support, said support having a swingable carriage hingedly attached thereto that has been opened to extend away from the far side of the tree, said carriage including a lower angled far side catch frame;
   b. engaging the shaking mechanism to the tree;
   c. swinging said carriage in so that it closes around the far side of the tree;
   d. engaging the far side catch frame with the chassis;
   e. activating the shaking mechanism;
   f. collecting the crops shaken loose from the tree in said catch frames and deflection panel; and
   g. conveying the crops away from the tree.

17. The method of claim 16 comprising the additional steps of:
   h. deactivating the shaking mechanism;
   i. disengaging the shaking mechanism from the tree;
   j. disengaging the far side catch frame from the chassis;
   k. swinging the carriage open and away from the tree; and
   l. moving said chassis away from the tree.

18. The method of claim 17 comprising the additional steps of:
   m. repeating steps "a" through "l" for each additional tree to be harvested.

* * * * *